United States Patent Office 3,364,557
Patented Jan. 23, 1968

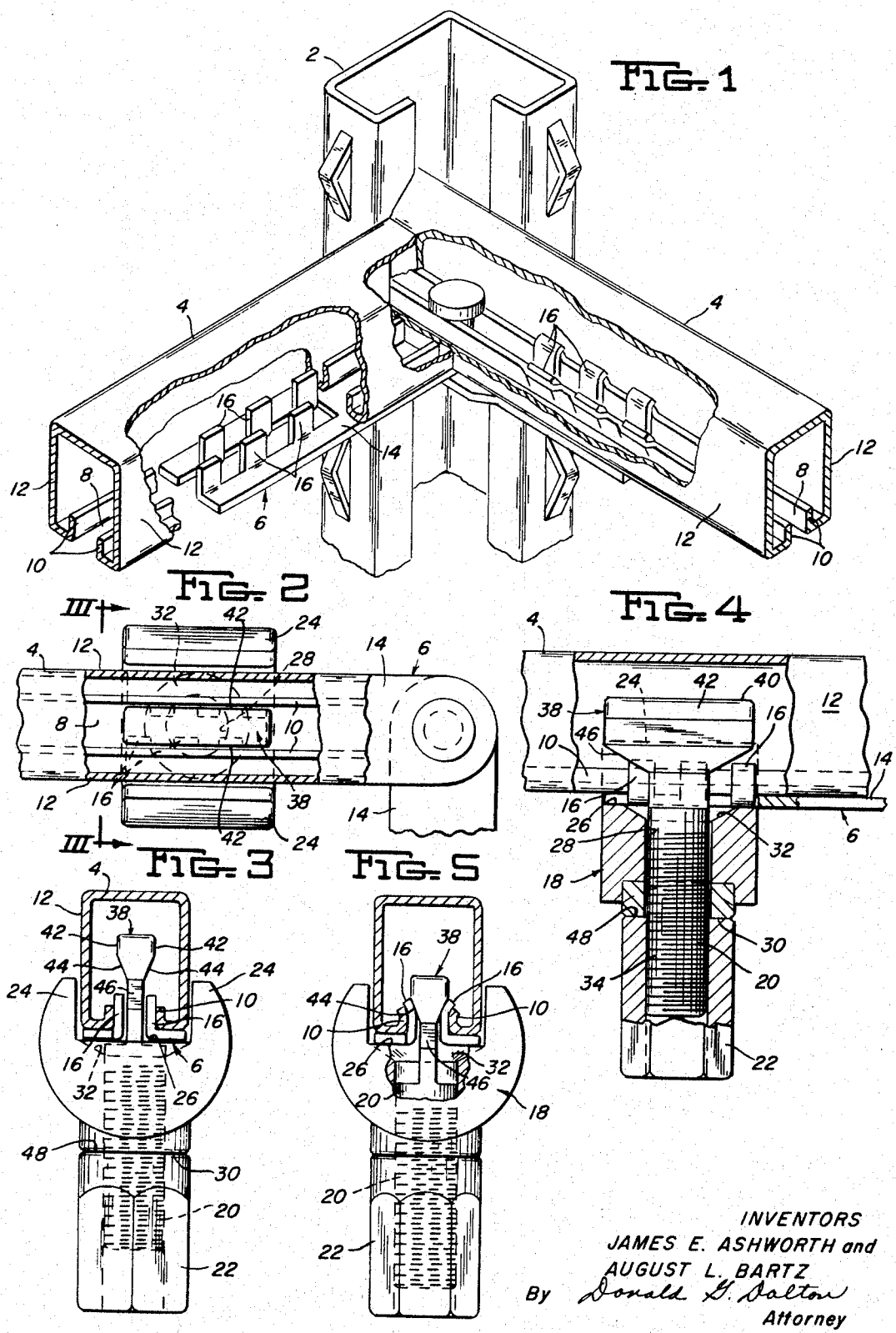

3,364,557
WEDGE-TYPE TOOL FOR OVEREDGE BENDING OF RAIL CONNECTOR FLANGES
James E. Ashworth, Moraga, and August L. Bartz, Alamo, Calif., assignors to United States Steel Corporation, a corporation of Delaware
Filed Feb. 27, 1967, Ser. No. 618,986
8 Claims. (Cl. 29—243.5)

ABSTRACT OF THE DISCLOSURE

A tool for securing a connector to a hollow fence rail of the type with a bottom longitudinal slot and flanges extending upwardly from the slot. When the connector flanges are positioned in the slot, the tool, by means of screw and wedge action, bends the connector flanges and rail flanges outwardly into a secure connection.

---

This invention relates to a tool for securing two flange members together and particularly for securing a connector to a hollow fence rail of the type shown in our co-pending application Ser. No. 568,874, filed July 29, 1966, now Patent No. 3,333,025, entitled, "Adjustable Rail Corner Assembly." As shown in this application, the rail is hollow with a bottom longitudinal slot and has upwardly extending flanges on each side of the slot. The bottom surface of the rail rests on a connector which has spaced flanges extending upwardly through the slot adjacent the rail flanges. It is necessary that the connector flanges be bent outwardly into the rail flanges in the field. This was a difficult job with those tools of which we had knowledge, so that the time required for the assembly was unduly long.

It is therefore an object of our invention to provide a portable hand tool capable of securing together two flanged members of the type described.

Another object is to provide such a tool that can rapidly secure the rails to a fence post.

Still another object is to provide such a tool that is inexpensive, light weight, and simple to manufacture.

These and other objects will be more apparent after referring to the following specification and attached drawing, in which:

FIGURE 1 is a perspective view of a rail and post assembly, with parts broken away, showing one connector assembled and another prior to assembly;

FIGURE 2 is a plan view showing the tool positioned for operation in a rail;

FIGURE 3 is a view taken on line III—III of FIGURE 2;

FIGURE 4 is a view, partly in section, taken at right angles to FIGURE 3; and

FIGURE 5 is a view, similar to FIGURE 3, but showing the tool after it has secured the parts together.

Referring to FIGURE 1 of the drawings, reference numeral 2 indicates an open corner fence post which supports two hollow fence rails 4 joined by a connector 6. The rails include a longitudinal slot 8, inwardly extending flanges 10, and sides 12. The connector 6 has a horizontal surface 14, and spaced flanges 16 parallel to flanges 10.

The tool of our invention consists of a housing 18, a screw 20, and a nut 22. The housing 18 includes bifurcated sides 24 at its upper end which are spaced apart a sufficient distance to fit the lower exterior sides 12 of a rail 4, a shoulder 26 extending between the sides 12 at the base thereof, an axial opening 28 therethrough substantially normal to shoulder 26, and a bottom surface 30 substantially parallel to shoulder 26. The top of the opening 28 has a bevelled edge 32.

The screw 20 includes a threaded shank 34 and an anvil portion 38 which has a head 40, parallel sides 42, inwardly extending bevelled bottom surfaces 44, and end bottom surfaces 46.

The nut 22 is threaded to receive the shank 34, has a horizontal top surface 48, and is hexagonal shaped on the other end for use with a wrench.

In operation, the tool is assembled by inserting threaded shank 34 of the screw 20 through axial opening 28 in the housing 18 and threading the nut 22 thereon. With the connector 6 positioned in the rail 4 and with the anvil 38 in its extended position as shown in FIGURE 3, the tool is inserted up through the slot 8 in the rail 4 at a position spaced from connector 6. The tool is then slid toward fence post 2 until the anvil 38 is centered over the spaced flanges 16 of connector 6, with the connector 6 resting on shoulder 26 of the housing 18 and the sides 12 of rail 4 against sides 24 of housing 18 as shown in FIGURES 2, 3 and 4.

With the tool in the above described position, fastening is accomplished by rotating the nut 22, and when surfaces 30 and 48 are in intimate contact the anvil 38 is drawn downward against the spaced flanges 16 of the connector 6. The inwardly extending surfaces 44 of the screw 20 force the spaced flanges 16 to spread outwardly from the top and deform the inwardly extending flanges 10 of the rail 4 so that the spaced flanges 16 are embedded into the inwardly extending flanges 10 as shown in FIGURES 1 and 5. Maximum downward travel of the screw 20 is limited by the inwardly extending surfaces 46 contacting the matching bevelled edge 32. However, the effect of the crimping, the deformation and crowding of metal occurring between the spaced flanges 16 and the inwardly extending flanges 10 of the rail 4, will usually limit the travel of the screw.

To remove the tool, the nut 22 is backed off until the screw 20 is free from the fastened joint to a position such as shown in FIGURE 3. The tool is then slid past the connector 6 and removed from the rail 4.

While one embodiment of our invention has been shown and described, it will be apparent that other adaptations and modifications may be made without departing from the scope of the following claims.

We claim:
1. A tool for fastening two members together, one member being an open section rail having a longitudinal slot in one side with flanges extending inwardly from each edge of the slot generally normal to said one side, said open section rail having a pair of sides one attached to each edge of said one side and extending in the same general direction as said flanges, the other member being a connector having a surface resting against the outer surface of said one side and spaced flanges extending inwardly through said slot adjacent said rail flanges; said tool including:
   (a) a housing having an axial opening therethrough, a first surface at one end of said axial opening substantially normal thereto, and means on the other end of said housing adapted to receive said two members;
   (b) a member movably mounted on said axial opening, said member including a longitudinal portion in said axial opening, an anvil portion adapted to be positioned within said rail above said flanges and beyond said axial opening, and means connecting said longitudinal portion to said anvil portion; and
   (c) means for moving said anvil portion toward said housing against said connector flanges to force them apart and into said rail flanges.
2. A tool according to claim 1 in which said longitudinal portion of said movable member includes a threaded shank extending from the end of said axial opening oppo- site said anvil portion, and said moving means includes a nut threaded on said threaded shank and bearing against said first surface of housing.

3. A tool according to claim 1 in which said anvil portion includes a head with a surface width remote from said housing less than the width of the longitudinal slot in said rail, and inwardly extending surfaces adjacent said housing extending toward said housing.

4. A tool according to claim 3 in which said longitudinal portion of said movable member includes a threaded shank extending from the end of said axial opening opposite said anvil portion, and said moving means includes a nut threaded on said threaded shank and bearing against said first surface of housing.

5. A tool according to claim 1 in which said means for receiving said members to be fastened includes bifurcated sides extending from the other end of said axial opening generally parallel to the axis thereof, the distance between said bifurcated sides being greater than the diameter of said axial opening so as to form a shoulder therebetween, said two members adapted to be received between said bifurcated sides with said other member resting on said shoulder.

6. A tool according to claim 5 in which said longitudinal portion of said movable member includes a threaded shank extending from the end of said axial opening opposite said anvil portion, and said moving means includes a nut threaded on said threaded shank and bearing against said first surface of housing.

7. A tool according to claim 5 in which said anvil portion includes a head with a surface width remote from said housing less than the width of the longitudinal slot in said rail, generally parallel sides extending toward said housing, and inwardly extending surfaces extending from said parallel sides toward said housing.

8. A tool according to claim 7 in which said longitudinal portion of said movable member includes a threaded shank extending from the end of said axial opening opposite said anvil portion, and said moving means includes a nut threaded on said threaded shank and bearing against said first surface of housing.

References Cited

UNITED STATES PATENTS

| | | | |
|---|---|---|---|
| 2,331,709 | 10/1943 | Mayne | 29—243.57 |
| 3,084,428 | 4/1963 | Wilson | 29—513 X |

MILTON S. MEHR, *Primary Examiner.*

UNITED STATES PATENT OFFICE
CERTIFICATE OF CORRECTION

Patent No. 3,364,557  January 23, 1968

James E. Ashworth et al.

It is hereby certified that error appears in the above numbered patent requiring correction and that the said Letters Patent should read as corrected below.

Column 1, line 24, for "3,333,025" read -- 3,367,688 --.

Signed and sealed this 20th day of May 1969.

(SEAL)
Attest:

Edward M. Fletcher, Jr.

Attesting Officer

Commissioner of Patents